US011440099B2

(12) United States Patent
Wu

(10) Patent No.: US 11,440,099 B2
(45) Date of Patent: Sep. 13, 2022

(54) PROCESSES AND SYSTEMS FOR DOUBLE-PULSE LASER MICRO SINTERING

(71) Applicant: Purdue Research Foundation, West Lafayette, IN (US)

(72) Inventor: Benxin Wu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 460 days.

(21) Appl. No.: 16/427,638

(22) Filed: May 31, 2019

(65) Prior Publication Data

US 2020/0009655 A1 Jan. 9, 2020

Related U.S. Application Data

(60) Provisional application No. 62/693,684, filed on Jul. 3, 2018.

(51) Int. Cl.
*B22F 12/00* (2021.01)
*B33Y 10/00* (2015.01)
(Continued)

(52) U.S. Cl.
CPC .......... *B22F 12/00* (2021.01); *B23K 26/0622* (2015.10); *B23K 26/356* (2015.10);
(Continued)

(58) Field of Classification Search
CPC ...... B22F 12/00; B22F 10/10; B22F 2999/00; B33Y 10/00; B33Y 30/00; B23K 26/0622; B23K 26/356; B23K 26/082
See application file for complete search history.

(56) References Cited

U.S. PATENT DOCUMENTS

| 8,784,720 B2 * | 7/2014 | Oberhofer | B33Y 30/00 264/401 |
| 11,097,470 B2 * | 8/2021 | Zhao | B33Y 30/00 |
| 2014/0271328 A1 * | 9/2014 | Burris | B33Y 10/00 419/53 |

FOREIGN PATENT DOCUMENTS

CN 107336440 A * 11/2017 ............. B29C 64/35

OTHER PUBLICATIONS

I. Theodorakos, F. Zacharatos, R. Geremia, D. Karnakis, I. Zergioti, Selective laser sintering of Ag nanoparticles ink for applications in flexible electronics, Oct. 27, 2014, Elsevier, Applied Surface Science vol. 336, pp. 157-162 (Year: 2014).*
(Continued)

*Primary Examiner* — Nicholas A Wang
*Assistant Examiner* — Maxwell Xavier Duffy
(74) *Attorney, Agent, or Firm* — Hartman Global IP Law; Gary M. Hartman; Domenica N. S. Hartman

(57) ABSTRACT

Processes and systems that include one or more laser beam sources configured to provide laser irradiation with one or more laser pulse groups to at least a portion of powder particles on a solid surface at one or multiple locations thereof. Sintering laser pulse(s) is provided to induce coalition of at least some of the powder particles into a more continuous medium, and pressing laser pulse(s) is provided to produce pressure pulse(s) on at least a portion of the powder particles and/or the more continuous medium. Laser pulse groups may include one or more of the sintering laser pulses followed by one or more of the pressing laser pulses with a time delay between a last of the sintering laser pulse(s) and a first of the pressing laser pulse(s).

10 Claims, 2 Drawing Sheets

(51) Int. Cl.
*B23K 26/0622* (2014.01)
*B23K 26/356* (2014.01)
*B33Y 30/00* (2015.01)
*B22F 10/10* (2021.01)

(52) U.S. Cl.
CPC .............. *B33Y 10/00* (2014.12); *B33Y 30/00* (2014.12); *B22F 10/10* (2021.01)

(56) References Cited

OTHER PUBLICATIONS

S. S. Harilal, G. V. Milshevsky, P. K. Diwakar, N. L. LaHaye, A. Hassanein, Experimental and computational study of complex shockwave dynamics in laser ablation plumes in argon atmosphere, Aug. 10, 2012, American Institute of Physics, Physics of Plasma 19 (Year: 2012).*

Abe, F. et al., "The Manufacturing of Hard Tools From Metallic Powders by Selective Laser Melting", Journal of Materials Processing Technology, (2001); 111(1-3), pp. 210-213.

Forsman, A.C. et al., "Double-Pulse Machining as a Technique for the Enhancement of Material Removal Rates in Laser Machining of Metals", J. Appl. Phys. 98, https://doi.org/10.1063/1.1996834, pp. 7; (2005).

Harilal, S.S. et al., "Experimental and Computational Study of Complex Shockwave Dynamics in Laser Ablation Plumes in Argon Atmosphere", Physics of Plasmas, 19:083504, (2012).

Ke, L. et al., "Effects of Peak Laser Power on Laser Micro Sintering of Nickel Powder By Pulsed Nd: YAG Laser." Rapid Prototyping Journal, 20: 328-335, (2014).

Regenfuss, P. et al., "Principles of Laser Micro Sintering", Rapid Prototyping Journal, 13:204-212, (2007).

Streek, A. et al., "Fundamentals of Energy Conversion and Dissipation in Powder Layers During Laser Micro Sintering", Physics Procedia, 41:858-869, (2013).

Streek, A. et al., "Laser Micro Sintering—A Quality Leap Through Improvement of Powder Packing", The Proceedings of the 19th Annual SHF Symposium, vol. 297, 12 pages; (2008).

Tao, S. et al., "Infrared Long Nanosecond Laser Pulse Ablation of Silicon: Integrated Two-Dimensional Modeling and Time-Resolved Experimental Study", Applied Surface Science, 258:7766-7773, (2012).

Vaezi, M. et al., "A Review on 3D Micro-Additive Manufacturing Technologies", The International Journal of Advanced Manufacturing Technology, 67:1721-1754, (2013).

Zhu, H. et al., "Effect of The Q-Switch Parameters on The Sintering Behavior of Laser Micro Sintering Cu-Based Metal Powder Using Q-Switched Nd-YAG Laser", Rapid Prototyping Journal, 19: 44-50, (2013).

* cited by examiner

PROCESSES AND SYSTEMS FOR DOUBLE-PULSE LASER MICRO SINTERING

CROSS REFERENCE TO RELATED APPLICATIONS

This application claims the benefit of U.S. Provisional Application No. 62/693,684, filed Jul. 3, 2018, the contents of which are incorporated herein by reference.

STATEMENT REGARDING FEDERALLY SPONSORED RESEARCH

This invention was made with government support under Grant No. CMMI 1728481 awarded by the National Science Foundation. The government has certain rights in the invention.

BACKGROUND OF THE INVENTION

The present invention generally relates to sintering processes. The invention particularly relates to a "double-pulse laser micro sintering" (DP-LMS) process that includes sending out sintering laser pulse(s) for inducing particle coalition and pressing laser pulse(s) for improving densification and reducing porosity of sintered material.

As used herein, laser sintering is defined in a broad sense as a process where coalition of two or more particles occurs directly or indirectly due to (at least partially) laser irradiation, regardless of particle types, sizes and shapes and regardless of whether or not partial or full melting of the particle material occurs. Laser sintering can be potentially applied in many areas. Some examples include fabrication of components for flexible electronics, synthesis of composites, production of surface coatings on substrates, and manufacturing of parts through layer-by-layer selective laser sintering (SLS). Part manufacturing by SLS can often have advantages such as rapidness (i.e., short lead time), good flexibility, and the capability of producing complicated shapes. When laser sintering is applied to produce feature(s) with size(s) less than 1 mm at one or multiple locations and in one or multiple directions, the process can be referred to as laser micro sintering (LMS).

The densification and porosity of a laser-sintered material may strongly affect its mechanical properties. There is an ongoing desire for increasing densification and reducing porosity of sintered materials in LMS without significantly decreasing the process efficiency or any other significant and undesirable limit. This could improve the mechanical properties of the parts, features, surface coatings or material layers produced by LMS.

BRIEF DESCRIPTION OF THE INVENTION

The present invention provides processes and systems suitable for sintering products with potentially increased densification and reduced porosity without a significant efficiency reduction relative to products formed by conventional laser sintering methods under similar conditions.

According to one aspect of the invention, a laser sintering process is provided that includes providing powder particles on a solid surface so that at least a portion of the powder particles forms a material surface, and then or simultaneously laser irradiating the material surface with one or more laser pulse groups at one or multiple locations to induce coalition of at least some of the powder particles into a more continuous medium. At least one of the one or more laser pulse group(s) includes one or more sintering laser pulses followed by one or more pressing laser pulses. At least one of the sintering laser pulse(s) is different from at least one of the pressing laser pulse(s) in at least one parameter or characteristic selected from the group consisting of laser pulse duration, laser pulse energy, peak laser power within a laser pulse, laser spot size on the material surface, laser beam wavelength, the relation of laser power versus time within the laser pulse, spatial profile of laser beam intensity on the material surface, and any combination thereof. A time delay is provided between a last one of the sintering laser pulse(s) and a first one of the pressing laser pulse(s).

The output of a laser source, even with the same controlling parameters, may still have normal variations or fluctuations. In this disclosure, the word "different" means that the corresponding "difference" is larger than such normal variations or fluctuations.

According to another aspect of the invention, a system is provided that includes one or more laser beam sources configured to provide laser irradiation with one or more laser pulse groups to a material surface formed by at least a portion of powder particles that are on a solid surface (and/or being provided on the solid surface) at one or multiple locations of the material surface. At least one of the one or more laser beam sources is configured to produce sintering laser pulse(s) that induce coalition of at least some of the powder particles into a more continuous medium. At least one of the one or more laser beam sources is configured to produce one or more pressing laser pulses configured to produce pressure pulse(s) on at least a portion of the powder particles and/or the more continuous medium. The system is capable of producing a first laser pulse group that includes one or more of the sintering laser pulses followed by one or more of the pressing laser pulses in a manner such that at least one of the sintering laser pulse(s) is different from at least one of the pressing laser pulse(s) in at least one parameter or characteristic selected from the group consisting of laser pulse duration, laser pulse energy, peak laser power within a laser pulse, laser spot size on the material surface, laser beam wavelength, the relation of laser power versus time within the laser pulse, spatial profile of laser beam intensity on the material surface, and any combination thereof. The system is also capable of providing a time delay between a last one of the sintering laser pulse(s) and a first one of the pressing laser pulse(s).

Technical effects of the laser sintering process and system described above preferably include the ability to sinter products with increased densification and reduced porosity, preferably without a significant efficiency reduction, relative to products formed by conventional laser sintering methods under similar conditions, including but not limited to products that include micro-scale sized features.

Other aspects and advantages of this invention will be appreciated from the following detailed description.

DETAILED DESCRIPTION OF THE INVENTION

Disclosed herein is a process referred to as "double-pulse laser micro sintering" (DP-LMS) that is believed to be able to produce products having micro-scale feature(s) with more continuous and densified sintered regions relative to those formed by conventional LMS processes under similar conditions. Although the term "micro" is used in the name of the DP-LMS process, it is within the scope of the invention that the process may be used to convert powder particles into a more continuous medium without any micro-scale sized features.

In this disclosure, a "sintering" process is defined as any process where coalescence of two or more powder particles occurs, regardless of the size, shape and type of the particles, and regardless of whether or not partial or full melting of the particles occurs during the process. The particles can have spherical or non-spherical shapes (such as a tube or fiber shape, etc.). Based on this definition, "micro sintering" is further defined as a sintering process, where a more continuous medium (i.e., a mass formed by interconnected particles) generated by particle coalition during the sintering process has at least one feature having a size, in at least one direction and in at least one location of the medium, which is below one millimeter. "Laser micro sintering" (LMS) is further defined as a micro sintering process, where the particle coalition is directly or indirectly due to, at least partially, the energy input from at least one laser beam to at least a portion of the particles. In this disclosure, for simplicity, sometimes powder particles may still be called "powder particles" even if after partial or full melting or coalition of the particles has occurred. In this disclosure, powder particles, as a whole object, regardless of whether or not any particle coalition or melting has occurred, can be referred to as a "target". During the DP-LMS process, at least a portion of powder particles are sintered through irradiation at one or multiple surface locations thereon by one or multiple groups of laser pulses. The powder particles may be pre-placed onto a solid surface (e.g., a substrate, support, powder bed, a previously sintered material layer, or any other kind of solid surface), or injected through a nozzle or any suitable particle-delivery device during the sintering process toward the solid surface, or a combination thereof.

Figure 1:
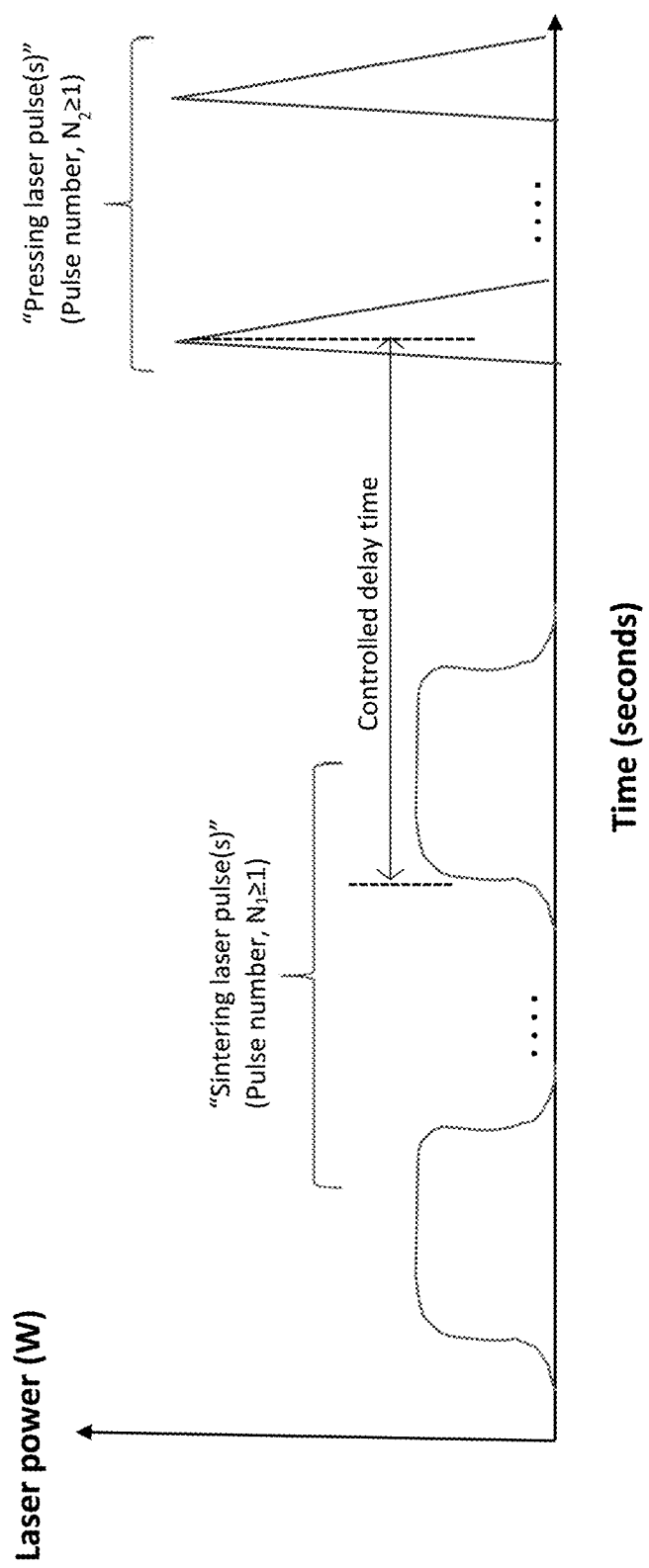
FIG. 1 includes a schematic diagram representing a laser pulse format for each laser pulse group used in a double-pulse laser micro sintering (DP-LMS) process in accordance with certain nonlimiting aspects of the invention (not drawn to scale).

FIG. 1 represents a nonlimiting embodiment of the laser pulse format in one laser pulse group for the DP-LMS process. In general, the process involves the use of one or multiple laser pulse groups. At least one of the laser pulse groups comprises $N_1$ "sintering laser pulse(s)" (where $N_1 \geq 1$), followed by $N_2$ "pressing laser pulse(s)" (where $N_2 \geq 1$) at a controlled and suitable delay time. Although the process is referred to as double-pulse laser micro sintering, the total pulse number in the laser pulse group may exceed two.

The sintering laser pulse(s) and the pressing laser pulse(s) can be produced by different laser beam sources or the same laser beam source. At least one of the following two conditions must be met for at least one laser pulse group: (1) at least one of the pressing laser pulse(s) differs from at least one of the sintering laser pulse(s) in the same laser pulse group in at least one of the parameters or characteristics selected from the following list: laser pulse duration, laser pulse energy, peak laser power within the laser pulse, laser spot size on a material surface formed by powder particles and irradiated by the laser beam(s), laser beam wavelength, the relation of laser power versus time in the laser pulse, and spatial profile of laser beam intensity on the irradiated material surface and any combination thereof, and (2) if there are two or more sintering laser pulses in the laser pulse group, the temporal distance between the last sintering laser pulse and the first pressing laser pulse is different from at least one of the temporal distances between two adjacent sintering laser pulses in the same laser pulse group.

The sintering laser pulse(s) are intended mainly to induce coalition of at least a portion of the powder particles, although other effects may be generated. The pressing laser pulse(s) are intended mainly to improve the sintering process by generating one or more potential benefits, including lower porosity in the sintered material, better densification of the sintered material, a less severe balling phenomenon (i.e., a phenomenon where laser-induced powder melt contracts into discrete liquid droplets which re-solidify into a ball or similar shape), and better mechanical properties of the sintered material. Other effects may also be generated by the pressing laser pulse(s). During DP-LMS, different laser pulses may irradiate the same or different target locations.

The generation of the aforementioned potential benefit(s) by the pressing laser pulse(s) may be a result of laser-induced material vaporization (and/or material ejection in other state(s)) from the target surface, and/or a plasma plume at or near the target surface. The surface vaporization process (and/or material ejection in other state(s)) and/or the plasma plume may induce high pressure pulse(s) onto the target surface, which may promote powder melt flow, inhibit or reduce the balling phenomenon, compact the target material, and/or decrease the porosity and increase the densification of the sintered material.

For each laser pulse group, the sintering laser pulse(s) preferably have sufficiently high power densities and fluences to effectively induce coalition of at least a portion of the powder particles. The pressing laser pulse(s) preferably have sufficiently high power densities and fluences to induce one or more of the aforementioned benefits, by generating material vaporization from the target surface, and/or plasma plume at or near the target surface, and/or through other possible mechanism(s). Within each laser pulse group, the first pressing laser pulse should follow the last sintering laser pulse at a delay time within a suitable range to effectively generate one or more of the aforementioned benefits. In particular, the first pressing laser pulse is typically sent to the target surface before the temperature of the laser-irradiated target surface region (i.e., the surface region within the laser spot of the pressing laser pulse) drops back to the room temperature (e.g., about 20 to 25° C.). In many situations, it may be desirable (although not necessarily mandatory) to send the first pressing laser pulse when the laser-irradiated target surface region still remains melted or partially melted. In addition, for each laser pulse group the target surface region irradiated by the first pressing laser pulse preferably overlaps with, substantially overlaps with, or at least is adjacent to the target surface region irradiated by the last preceding sintering laser pulse. Preferably, for each laser pulse group the amount of target material removed by all the pressing laser pulse(s), if any, is smaller than the amount of target material sintered by all the preceding sintering laser pulse(s) in the same laser pulse group.

An exemplary but nonlimiting DP-LMS process may include applying the sintering laser pulse(s) and pressing laser pulse(s) in a manner such that the transient peak power density (absorbed by the target) in space and time for the pressing laser pulse(s) is higher than that for the sintering laser pulse(s) in the same laser pulse group; the total energy of all the pressing laser pulse(s) (absorbed by the target) is smaller than that for all the preceding sintering laser pulse(s) in the same laser pulse group; and the first pressing laser pulse is fired at a suitable delay time after the last preceding sintering laser pulse within the same laser pulse group, when the target surface region within the laser spot of the pressing laser pulse still remains at temperature(s) higher than the room temperature (and possibly desirably in many situations, also remains at least partially melted).

The DP-LMS process can be potentially carried out to sinter one material layer or sinter multiple material layers layer-by-layer, where different sintered layers may have the same or different sizes, shapes, and/or compositions of sintered material. The DP-LMS process can be potentially applied to produce a free-standing part, coating(s) or material layer(s) onto a substrate, and other potential application(s).

Figure 2:
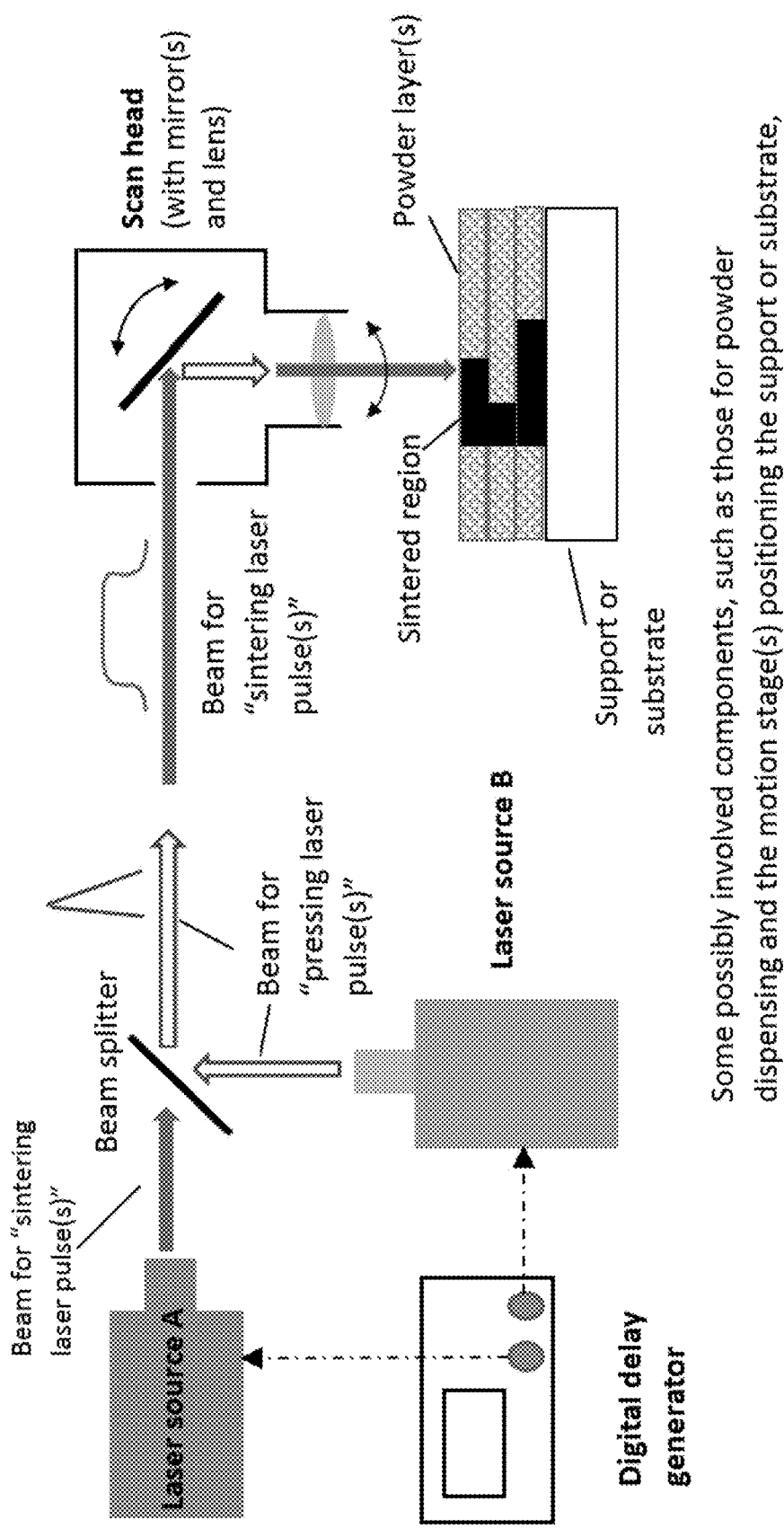
FIG. 2 schematically represents a nonlimiting example of a possible setup for a DP-LMS process (not drawn to scale).

As a non-limiting example, FIG. 2 shows a schematic diagram of one possible setup for DP-LMS, where only some of the devices involved are shown. The "sintering laser pulse(s)" is generated by Laser Source A, while the "pressing laser pulse(s)" is generated by Laser Source B. The laser beam from Laser Source A passes (at least partially) through the beam splitter, while the laser beam from Laser Source B is reflected (at least partially) by the beam splitter. Then the two beams enter a scan head (with mirror(s) and lens inside), which delivers the laser beams onto the powder surface and can also move the laser spots on the surface following a controlled trajectory. A free-standing part can be potentially produced using DP-LMS through a layer-by-layer sintering approach. A layer of powder particles can be placed onto a support, substrate or previously placed material layer by a blade, roller, nozzle, and/or other possible particle dispensing or delivery device(s). After or when the powder layer is placed, a certain region of the powder layer can be sintered using DP-LMS, where the sintered region shape can be controlled by controlling the laser spot traveling trajectory through the scan head and/or motion stages (not drawn). After one layer is sintered, the next layer of powder particles can be placed and sintered. Eventually, through the layer-by-layer sintering approach, a part can be produced, whose three-dimensional geometry is determined by the geometry of the sintered region in each layer and the thickness of each layer. The layer thickness can be controlled through the powder dispensing device and/or the vertical displacement step of the motion stage(s). If the powder material does not react with the ambient air, or if the possible reaction(s) does not significantly affect the desired properties of the produced part, then DP-LMS can be carried out in the ambient air. Otherwise, during DP-LMS inert gas needs to be applied to protect the material region where undesirable chemical reactions with the ambient air may occur otherwise. The inert gas can be potentially applied through a nozzle, a gas chamber or other possible approach(es), as long as a sufficient inert-gas protection can be effectively applied to the region of interest. In addition to a free-standing part, one or multiple material layers can be sintered onto the surface of a substrate by DP-LMS following a similar approach.

As a non-limiting example, a short introduction is provided below regarding an experimental study of DP-LMS reported in a paper, Hanyu Song, Zheng Kang, Ze Liu and Benxin Wu, "Experimental study of double-pulse laser micro sintering: A novel laser micro sintering process", Manufacturing Letters, 19:10-14, 2019. The entire contents of this paper are incorporated herein by reference. In the study, for each laser pulse group, "sintering laser pulses" were effectively mainly 10 laser pulses (wavelength: about 1064 nm; total pulse duration: about 200 ns per pulse; average pulse energy: about 0.09 mJ/pulse) generated by Laser Source A (SPI G3.0). In each laser pulse group, the "pressing laser pulse" is one laser pulse (wavelength: about 1064 nm; full-width-at-half-maximum duration: about 5 ns per pulse; pulse energy: about 0.22 mJ/pulse) generated by Laser Source B (Bright Solutions, Onda). The laser beams were delivered by a laser scan head (ScanLab, HurryScan 14) onto the surface of cobalt powder (Alfa Aesar, Product number: 10455) preplaced onto an aluminum surface. The laser spot sizes on the powder surface for the sintering laser pulses and pressing laser pulse were roughly: about 70 μm and about 115 μm, respectively, which were roughly concentric with each other. Only a small region of a surface layer of the cobalt powder was sintered. A 3×3 array of the powder surface locations was laser-irradiated, and the distance between adjacent locations is about 75 μm. One laser pulse group was sent for each location. The laser spots were then moved to the next adjacent location to send another laser pulse group. Laser sintering experiments were carried out under the following conditions: (1) through DP-LMS as described above with a delay time of about 700 ns between the last sintering pulse and the pressing pulse in each laser pulse group; (2) using only 10 sintering laser pulses (about 0.09 mJ/pulse) for each laser-irradiated location; (3) using only 20 sintering laser pulses (about 0.09 mJ/pulse) for each location; (4) using only 10 sintering laser pulses (about 0.13 mJ/pulse) for each location; (5) using only 5 pressing pulses (about 0.22 mJ/pulse) for each location; and (6) through DP-LMS similar to Condition (1) except that a delay time of about 1 ms is used. Optical microscopic images were taken for laser-processed surface regions under the aforementioned conditions. It was found from the images that the surface region sintered by DP-LMS under Condition (1) appeared to be more densified, continuous, and/or show a less severe balling phenomenon in the microscopic image than those processed under Conditions (2) to (6). The study reported in the paper provided experimental evidence supporting the potential advantage of the DP-LMS process disclosed herein.

It should be noted that DP-LMS process setups, conditions, and parameters are not limited to those in the example given above. In particular, DP-LMS processes using laser pulses with various durations in, shorter than, or longer than the nanosecond range, and/or on metallic or non-metallic powders, and/or with various laser pulse energies, and/or with various laser spot sizes, and/or with various laser beam wavelengths, and/or with various relations of laser power versus time in the laser pulse, and/or with various laser beam intensity's spatial profiles on the irradiated material surface are all be within the scope of this invention. Further, DP-LMS does not necessarily require or exclude any treatment to the target powder before sintering or any treatment to the target material after sintering.

For a laser sintering process that only uses the sintering laser pulse(s), a sintering laser pulse, at sufficiently high intensities, may also generate surface vaporization and/or a plasma plume, which may lead to high pressures onto the target surface. However, the high pressures may often drop quickly after the completion of the sintering laser pulse, while a substantial portion of the melt flow process may still possibly occur afterwards. In the DP-LMS process, the timing of the "pressing pulse(s)" can be adjusted to potentially generate the relevant pressure impact onto the target at the most suitable time to maximize related benefit(s). In addition, in DP-LMS the parameters of the sintering laser pulse(s) and the pressing laser pulse(s) can be adjusted independently to potentially yield improved process adjustability, flexibility, and/or optimization potential than laser sintering processes that only use the sintering laser pulse(s). As a nonlimiting example, in DP-LMS the sintering laser pulse(s) and the pressing laser pulse(s) within each laser pulse group can be optimized mainly for the intended purpose of sintering and pressing (i.e., generating a pressure pulse onto the target), respectively.

While the invention has been described in terms of preferred/specific embodiments, it is apparent that other forms could be adopted by one skilled in the art. For example, materials and processes/methods other than those noted could be used. In addition, the invention encompasses additional embodiments in which one or more features or aspects of different disclosed embodiments may be combined. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A laser sintering process comprising:
providing powder particles on a solid surface so that at least a portion of the powder particles forms a material surface; and then or simultaneously
laser irradiating a target surface of the material surface with one or more laser pulse groups at one or multiple locations to induce coalition of at least some of the powder particles at the target surface into a more continuous medium comprising a mass formed by at least two interconnected powder particles;
wherein at least one of the one or more laser pulse group(s) comprises:
one or more sintering laser pulses that irradiate at least first irradiated target surface locations of the target surface followed by one or more pressing laser pulses that irradiate at least second irradiated target surface locations of the target surface, wherein the one or more pressing laser pulses have a peak power density at the second irradiated target surface locations that is higher than a peak power density of the one or more sintering laser pulses at the first irradiated target surface locations;
a time delay at the target surface between a last sintering laser pulse of the one or more sintering laser pulses and a first pressing laser pulse of the one or more pressing laser pulses; and
inducing, with the first pressing laser pulse, a pressure pulse onto the target surface by vaporizing material at the target surface and/or creating a plasma plume at the target surface, wherein at the moment right before the first pressing laser pulse arrives at the target surface, at least some material in at least part of the target surface melted or partially melted at least partially due to irradiation of the one or more sintering laser pulses still remains melted or at least partially melted when irradiated by the first pressing laser pulse.

2. The laser sintering process of claim 1, wherein the one or more sintering laser pulses of the at least one laser pulse group comprises two or more sintering laser pulses and a temporal distance between the last sintering laser pulse and the first pressing laser pulse is different from at least one of the temporal distances between two adjacent sintering laser pulses of the two or more sintering laser pulses in the at least one laser pulse group.

3. The laser sintering process of claim 1, wherein at least one sintering laser pulse of the one or more sintering laser pulses is different from at least one pressing laser pulse of the one or more pressing laser pulses in at least one parameter or characteristic selected from the group consisting of laser pulse duration, and laser pulse energy and any combination thereof.

4. The laser sintering process of claim 1, wherein the first pressing laser pulse is sent out while the material surface that is going to receive radiation from the first pressing laser pulse is at least partially at temperature(s) higher than about 25° C. from the last sintering laser pulse.

5. The laser sintering process of claim 1, wherein the first pressing laser pulse is sent out while the material in the at least part of the target surface is still melted from the last sintering laser pulse.

6. The laser sintering process of claim 1, wherein the more continuous medium has at least one feature that is smaller than one millimeter in at least one direction.

7. The laser sintering process of claim 1, wherein each pulse duration of each and every one of the one or more sintering laser pulses is in the range of 1 nanosecond (ns) to 1000 ns.

8. The laser sintering process of claim 1, wherein the powder particles are metallic particles.

9. The laser sintering process of claim 1, wherein the laser irradiating step occurs after at least a portion of the powder particles is provided on the solid surface.

10. The laser sintering process of claim 1, further comprising at least a second laser pulse group that comprises:
one or more sintering laser pulses followed by one or more pressing laser pulses, wherein at least one of the one or more sintering laser pulses is different from at least one of the one or more pressing laser pulses in at least one parameter or characteristic selected from the group consisting of laser pulse duration, laser pulse energy, peak laser power density within the laser pulse at the target surface, laser spot size on the target surface, laser beam wavelength, relation of laser power versus time within the laser pulse, spatial profile of laser beam intensity on the target surface, and any combination thereof; and
a time delay between a last one of the one or more sintering laser pulses and a first one of the one or more pressing laser pulses.

* * * * *